US008296549B2

(12) United States Patent
Zhao et al.

(10) Patent No.: US 8,296,549 B2
(45) Date of Patent: Oct. 23, 2012

(54) OVERLAPPING COMMAND AT ONE STAGE SUBMITTING METHOD OF DYNAMIC CYCLE PIPELINE

(75) Inventors: Zong Zhao, Shenzhen (CN); Min Ren, Shenzhen (CN); Hu Chen, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 477 days.

(21) Appl. No.: 10/585,016

(22) PCT Filed: Jun. 22, 2004

(86) PCT No.: PCT/CN2004/000670
§ 371 (c)(1),
(2), (4) Date: Apr. 24, 2007

(87) PCT Pub. No.: WO2005/064481
PCT Pub. Date: Jul. 14, 2005

(65) Prior Publication Data
US 2008/0072022 A1 Mar. 20, 2008

(30) Foreign Application Priority Data
Dec. 29, 2003 (CN) .......................... 2003 1 0112972

(51) Int. Cl.
*G06F 9/30* (2006.01)
(52) U.S. Cl. .................................................. 712/214
(58) Field of Classification Search .................. 712/214
See application file for complete search history.

(56) References Cited

U.S. PATENT DOCUMENTS 5,084,814 A * 1/1992 Vaglica et al. ................ 710/305
5,949,996 A 9/1999 Atsushi
6,115,811 A 9/2000 Steele, Jr.
6,343,357 B1 * 1/2002 Kawasaki et al. ............. 712/210

FOREIGN PATENT DOCUMENTS

| CN | 1332872 | 1/2002 |
| WO | WO 00/26744 | 5/2000 |

OTHER PUBLICATIONS

Hennessy & Patterson, Computer Organization and Design, 1998, Morgan Kaufmann Publishers, pp. 450, 461, 469, 489-491, 499, MIPs appendix.*
Hennessy, John. Patterson, David. "Computer Organization and Design: The Hardware/Software Interface". Morgan Kaufmann Publishers, Inc. Second Edition, 1998. pp. 476-481 and 492.*
International Search Report for International Application No. PCT/CN2004/000670 dated Oct. 14, 2004.

* cited by examiner

*Primary Examiner* — Robert Fennema
(74) *Attorney, Agent, or Firm* — Hamre, Schumann, Mueller & Larson, P.C.

(57) ABSTRACT

The invention discloses an overlapping command committing method of dynamic cycle pipeline, for a chip having pipeline structure, the method comprising the following steps: reading the command from command buffer, decoding the command, judging whether operator is reasonable or not, if a illegal command, then deleting, otherwise preprocessing the operator of command, preparing the initial operator of each pipeline, and observing the status of pipeline, waiting for pipeline command exiting signal, and judging whether there is command relevance or not, if not, then committing a new command to pipeline when the command exiting a last cycle of pipeline. Overlapping command committing method of the invention can avoid appearing of bubble, improve parallelism of pipeline performing unit, and thus shorten the processing period of command in chip, let the chip process more command in unit time.

17 Claims, 4 Drawing Sheets

OVERLAPPING COMMAND AT ONE STAGE SUBMITTING METHOD OF DYNAMIC CYCLE PIPELINE

FIELD OF THE INVENTION

The present invention relates to the design of various chips in the technical fields such as network communications, in particular, to a command submitting method of dynamic cycle pipeline processing for chips.

BACKGROUND OF THE INVENTION

In the design of communication chips, in order to meet the needs of the rapid increase of the speed and capacity of communication networks, the pipeline structure processing has been adopted in more and more chips. The pipeline technology is a technology of having the parallelism with space and time in computer technology, which breaks down one sequence process into several sub-processing steps, each of which can effectively perform simultaneously on the special independent module. These sub-processing steps are called stages, while every pipeline stage is composed of current register and hardware processing module (pure logic circuit), the former providing input to the latter, and the output of the latter point to the current register of the next stage; under the effect of clock pulse, every stage transmit the result from the completed processing to the next stage simultaneously. Submitting the command to the pipeline promptly, so as to assure that the command is continuously flowing in the pipeline, is the key of obtaining highly effective pipeline.

FIG. 1 illustrates the command submitting method of ring-form pipeline in the prior art, the ordinate stands for the stage of the pipeline, including six stages of pipelines, while the abscissa stands for time. A, B, C, D, E, F and G stand for the commands performed. The inserting position of the command is the first stage, and the command exiting position is the third stage of the pipeline. In case that all the pipeline stages are full, A, B, C, D, E and F are all performing in the pipeline, each of the current inset processing units inserts new command only after the pipeline commands entirely exit the cycle pipeline, as is illustrated by the figure, the new Command G is inserted after Command A completely exits the cycle pipeline, the "bubble" appears from the fourth stage to the sixth stage of the pipeline. Therefore, it cannot be guaranteed that the pipeline is flowing continuously, which thus affects the utilization efficiency of each elements of the pipeline and the parallelism of the command performance.

SUMMARY OF THE INVENTION

The objective of the present invention is to provide an overlapping command submitting method of dynamic cycle pipeline, which can avoid the appearance of bubble, and thus can improve the parallelism of the command performance and the utilization efficiency of every part of the pipeline.

In order to accomplish the above objective, the present invention provides an overlapping command submitting method of dynamic cycle pipeline for a chip having pipeline structure, comprising the following steps:

(a) reading the command from command buffer;

(b) decoding the command, judging whether it is a illegal command or not, if yes, then returning to step (a); otherwise, performing the next step;

(c) preprocessing the operator of the command, preparing the initial operator of each pipeline, and storing it into the initialization register;

(d) judging whether the pipeline is not full, if it is not full, directly inserting new command and then end; otherwise, waiting for the pipeline command exiting signal from the last pipeline period before exiting;

(e) after receiving the exiting signal, judging whether there is command relevance between the new command to be inserted and the old command to exit, if yes, then inserting the new command after the said old command exits, and then end; otherwise, performing the next step;

(f) in the last cycle of the pipeline by the said old command, submitting the new command to the pipeline.

The above method can be characterized as: the aforesaid command relevance means that the new command and the old command cannot share the hardware processing module of one pipeline stage.

The above method can be characterized as: in the aforesaid step (e), it also judges in which stage of the pipeline stage the new and old commands should perform field switch, and finishes the field switch in the corresponding pipeline stage where the new and old commands overlap.

In order to resolve the conflict on field, the above method can be characterized as: in the aforesaid step (e), it also judges whether there is field conflict between the new command and the old command, if the field conflict exists, then adds the field of the new command into the pipeline when submitting, while the field of the old command enters into field branch and maintains until the last time the old command use this field; if there is no field conflict, then finishes the field switch on the corresponding pipeline stage after submitting.

In order to better perform the above method, the present invention also provides a communication chip with the cycle pipeline structure, comprising: interface of host computer, input buffer, command processing unit, result unit; the said command processing unit comprises: command interpreter and pipeline performing unit; wherein, the said command interpreter further comprises: command buffer controllers which are connected in order, command register, operator processing unit, pipeline initialization register and control automaton; the said control automaton controls the said command buffer controller to read a command from the command buffer, and stores the said command into the command register; the said control automaton decodes the said command, and controls the processing unit of operator to prepare initial operator of each pipeline according to the type of said command, and stores it into the said pipeline initialization register.

Therefore, by using the overlapping command submitting method of dynamic cycle pipeline, the interval between each submitting of command is reduced, so as to improve the parallelism of pipeline performing unit and reduce the processing period of command in the chip, and thus let the chip process more command in unit time. Furthermore, the command submitting elements and the pipeline performing elements can each perform continuously, so that the time of the idle status of elements has been reduced to the minimum.

DETAILED DESCRIPTION OF THE PREFERRED EMBODIMENT

Figure 2:
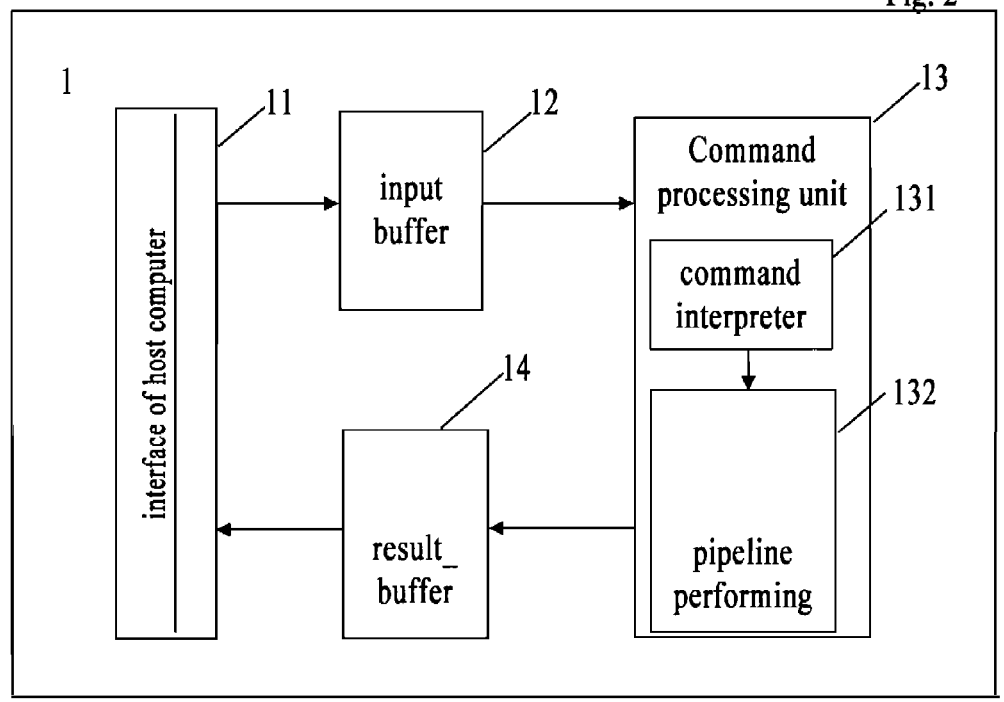
FIG. 2 is a block diagram of a chip on which embodiments of the invention may be implemented.

Hereunder the command submitting of pipeline in a communication chip is shown as an example to describe the implementation of this invention in detail. The structure of the chip is shown in FIG. 2, wherein the host computer interface 11 in this chip 1 receives various commands such as: reading/writing access of the memories, the reading/writing access of the control register, the search command of different calculation methods, etc from the host computer, and stores them into the input buffer 12, and the command processing unit 13 performs the operation of these commands; once the performance of the commands is completed, the performance results of the commands are stored in the result_buffer 14, to be retrieved by the host computer.

The chip in this embodiment supports the following commands:

Reading/writing memories command;

Reading/writing control register command; and

Search command, which support 8 kinds of calculation methods.

The command processing unit 13 is composed of two parts: command interpreter 131 and the pipeline performing element 132. The command interpreter 131 serves to draw the command word and operator from the command buffer and data buffer of the input buffer 12, and to send them into the pipeline.

Within the pipeline, the operation sequence of the performance of each command is fixed, but the time when the command enters into the pipeline for performance is determined by the pipeline status. The switch between different command operations on the pipelines is continuous, however, due to the possible cycle operation, the sequence of commands entering the pipeline may be inconsistent with the sequence of commands exiting the pipeline after the completion of performance. After the completion of the command performance, all the command results are retrieved in order by the result_buffer 14. The sequential operation of each command requires the continuous performance of several pipeline periods, whose cycle course is also controlled by the pipeline. The pipeline in this embodiment is divided into six stages, which can contain six commands at the same time, and the field of each command is flowing along the stage in the pipeline.

The command interpreter 131 and the pipeline performing unit 132 are working in parallelism: while the pipeline performing unit 132 is performing various command operations in parallelism, the command interpreter 131 is drawing the commands from the command buffer, conducting preprocessing, and submit one irrelevant command at one time to the pipeline by the overlapping submitting method.

Figure 5:
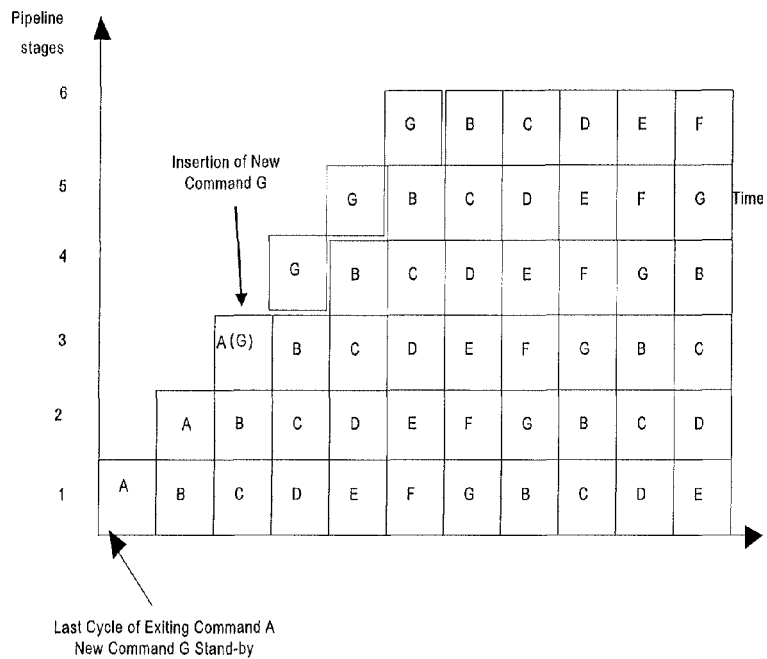
FIG. 5 is a schematic diagram of the overlapping command submitting in an embodiment of the invention.

The so called overlapping submitting method means inserting a new command in the last cycle of certain command before its exiting the pipeline, as is shown in FIG. 5, Command G is inserted in the last cycle of Command A before Command A exiting, so as to avoid the appearance of bubbles. In order to carry out the above method, it is required to provide a command exiting signal as early as possible during the pipeline period immediately before the last cycle of the exiting command; and it shall ascertain that there is no command relevance between the newly inserted command and the exiting command; in addition, between the inserted and exiting commands, the possible conflict of command fields formed by registers (referring to the current registers) shall be resolved.

Figure 3:
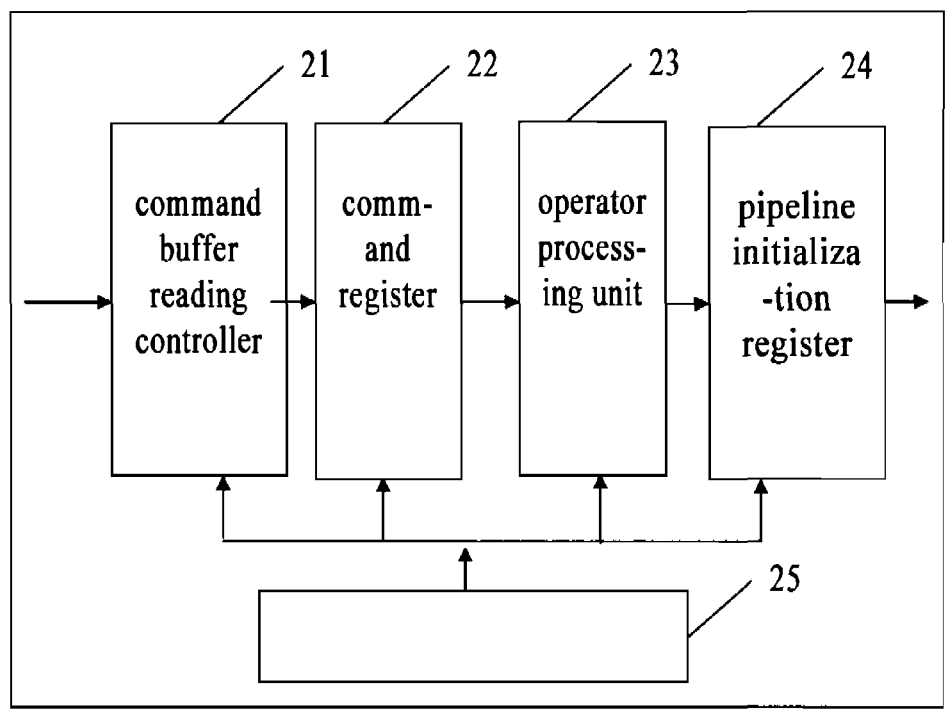
FIG. 3 is a block diagram of the command interpreter in FIG. 2.
Figure 4:
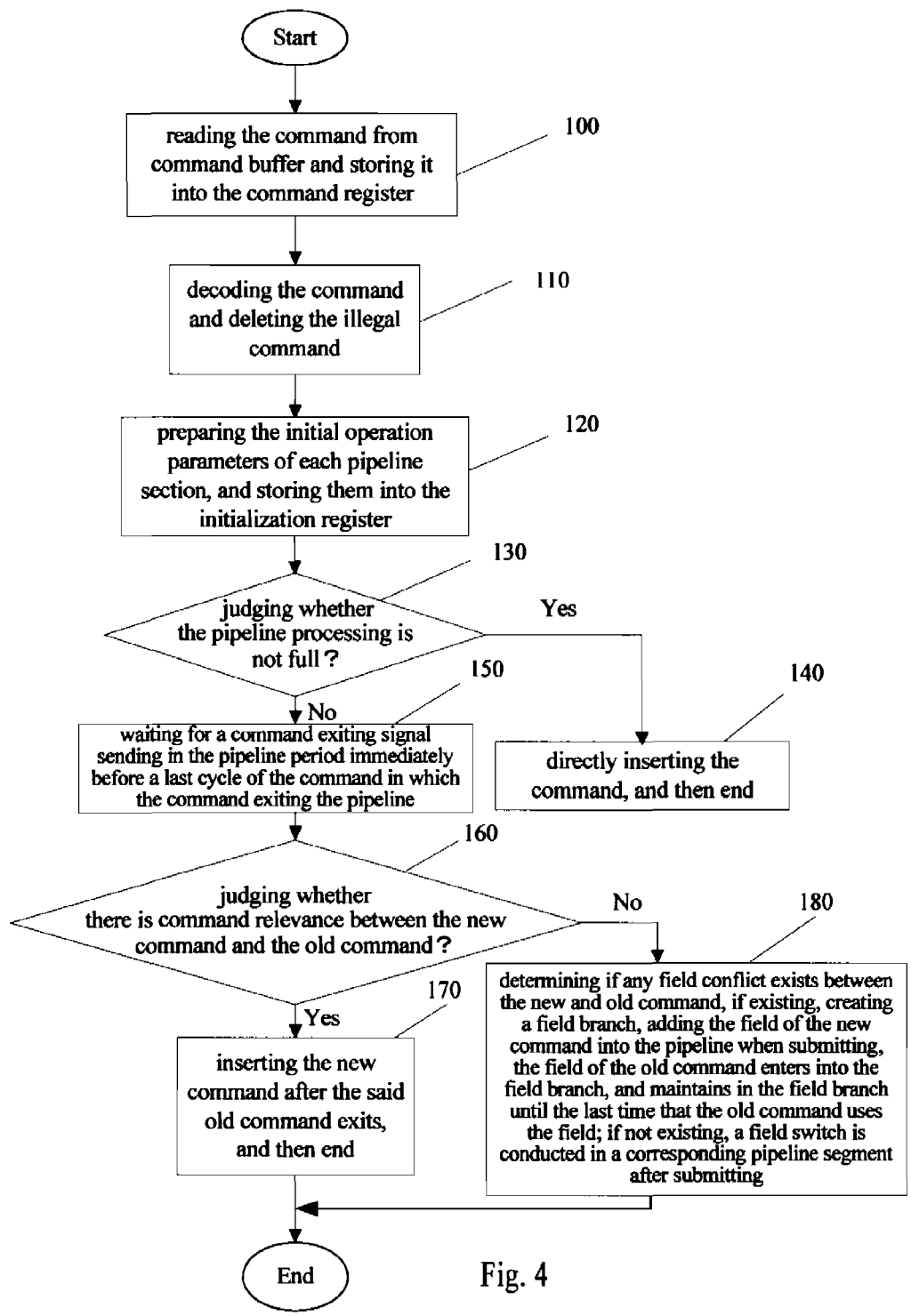
FIG. 4 is a flow chart of the overlapping command submitting of the command interpreter in an embodiment of the invention.

The constituting structure of the command interpreter 131 is shown in FIG. 3, including the command buffer reading controller 21, the command register 22, the operator processing unit 23, the pipeline initialization register 24 and the control automaton 25; the following is an explanation of the progress the command submitting method of the command interpreter 131 in this embodiment with reference to this structure, as is shown in FIG. 4, the method according to this embodiment comprises the following steps:

Step 100, the control automaton 25 of the command interpreter 131 controls the command buffer reading controller 21 to read commands from the command buffer, and stores them into the command register 22;

Step 110, the control automation 25 decodes the command, delete the illegal command which has incorrect command code or carries unreasonable command parameters;

Step 120, the control automaton 25 controls the operator processing unit 23 to prepare the initial operator of each pipeline based upon the type of command, and stores it into pipeline initialization register 24;

Step 130, judging whether the pipeline is not full (i.e., less than six commands), if the pipeline is not full, then conducting Step 140, otherwise (i.e., containing six commands), conducting Step 150;

Step 140, directly inserting the command, and then end;

Step 150, waiting for the command exiting signal provided by the pipeline;

Step 160, once receiving the command exiting signal, judging whether there is command relevance between the new command to be inserted and the old command to exit, if there is, then conducting Step 170, otherwise, conducting Step 180;

Step 170, inserting the new command after the old command exits, and then end;

Step 180, inserting the new command to the pipeline during the last cycle of the old command before exiting.

In case the initial operator in Step 120 is a reading/writing memories command, it is required to provide the memories access address and necessary written data; in case the initial operator in Step 120 is a search command, it is required to provide the key word for searching and the adopted calculating method for searching; in case the initial operator in Step 120 is a reading/writing control register command, it is required to provide the register access address and necessary written data. Besides, it is also required to provide the initial status when entering the pipeline for all kinds of commands, that is, to map the command word to the current register value of the pipeline when the command enters the pipeline.

In Step 150, in order to ascertain that the command interpreter can promptly determines the timing of inserting the command and to help the command interpreter determine the timing of inserting the command, it is required to provide an exiting signal indicating that a command is exiting the pipeline as early as possible in the pipeline period that is immediately before the last cycle of the exiting command. The timing, of releasing the pipeline exiting signal is fixed, which in this embodiment is two stages prior to when the new command is inserted into the pipeline stage. Taking FIG. 5 as an example, the new Command G is inserted at No. 1 pipeline stage, thus the pipeline exiting signal indicating that the old Command A is exiting is released at the fifth stage of the pipeline period immediately before the last cycle of the exiting Command A, and when the exiting Command A flows to the sixth stage of the pipeline, a command adding judgment logic determines whether or not to insert the new Command G.

In Step 160, the non-existence of command relevance means that the command to exit and the command to be inserted shall not access the same element, for example, the inserted command and the exiting command shall not use the hardware processing module element of the same pipeline stage at the same time, which can be predetermined by the operation flow of commands.

In Step 180, when the new command is inserted, since the field of the inserted command is sequentially added into several pipeline stages for operations, while the field of the exiting command may also be in use at the last several stages, it thus may cause conflict that the two may have to use the same one command current register at the same time. It is determined by the operation flow of various commands which fields shall be used in which pipelines, and the conflict between the new and old fields can be predetermined based on the overlapping command sequence.

Figure 6:
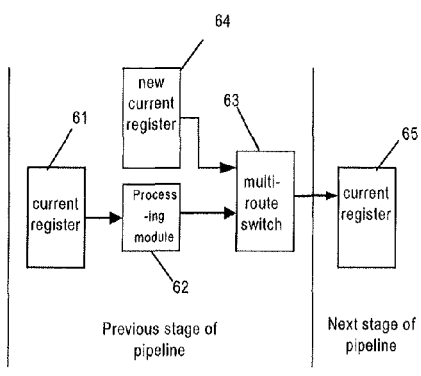
FIG. 6 is a schematic diagram of the hardware structure for field switching in the embodiments of the invention.

In most applications, the same field may just be switched to the field of new command before the possible use of the inserted command and after the last use of the exiting command. The hardware structure of such field switching is shown in FIG. 6. The current register 61 is connected to the multi-route switch 63 through the processing module 62, while the new current register (the new command) 64 is directly connected to the multi-route switch 63, and the input of the multi-route switch 63 is connected to the current register 65 of the next stage of pipeline. Normally, the content of the current register 61 of the last stage of pipeline subject to the processing of the processing module 62 and then enters into the current register 65 of the next stage of pipeline, while at the time of command overlapping, the new current register 64 enters into the current register 65 of the next stage of pipeline, and the field of the old command (located at the current register of the last pipeline) is deserted. In FIG. 5, all the three stages of command overlapping pipelines (pipeline stages 1, 2 and 3) can generate the aforesaid switch of current registers, and it can be determined in which stage the switch shall happen according to the specific operation command in the stage before inserting a new command.

Figure 7:
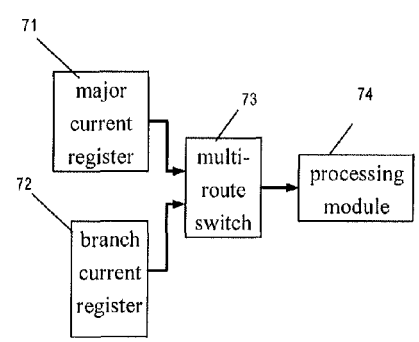
FIG. 7 is a schematic diagram of the hardware structure for field branching in the embodiments of the invention.

In some applications, the field conflict is inevitable, i.e. the new and old commands still need to use the current register in the same pipeline stage. In such case, a field branch is created, i.e. the field of the new command is inserted into the pipeline, while the field of the old command enters into the field branch, and such branch shall maintain until the last time the old command uses this field for operation. FIG. 7 illustrates the hardware structure of the field branch of one pipeline stage, and the other stages are same as this one. The so called field branch means there are two routes of current registers, one act as the major current register 71, while the other act as the branch current register 72, which are connected to the input of the processing module 74 through a multi-route switch 73.

As discussed above, the commands that could be overlapped will not incur conflict of processing module. In case new command shall be processed, the processing module will receive the input of the major current register, while in case the old command shall be processed, the processing module will receive the input from the field branch register, and the register not necessary to be processed can directly enter the similar current register in the next pipeline; after the last time the old command uses this field, the value of the field branch register is then deserted. The judgment on the field conflict is made at the same time of the judgment of relevance, that is, at the stage before inserting the new command, and the old command enters into the field branch at the first stage.

Figure 1:
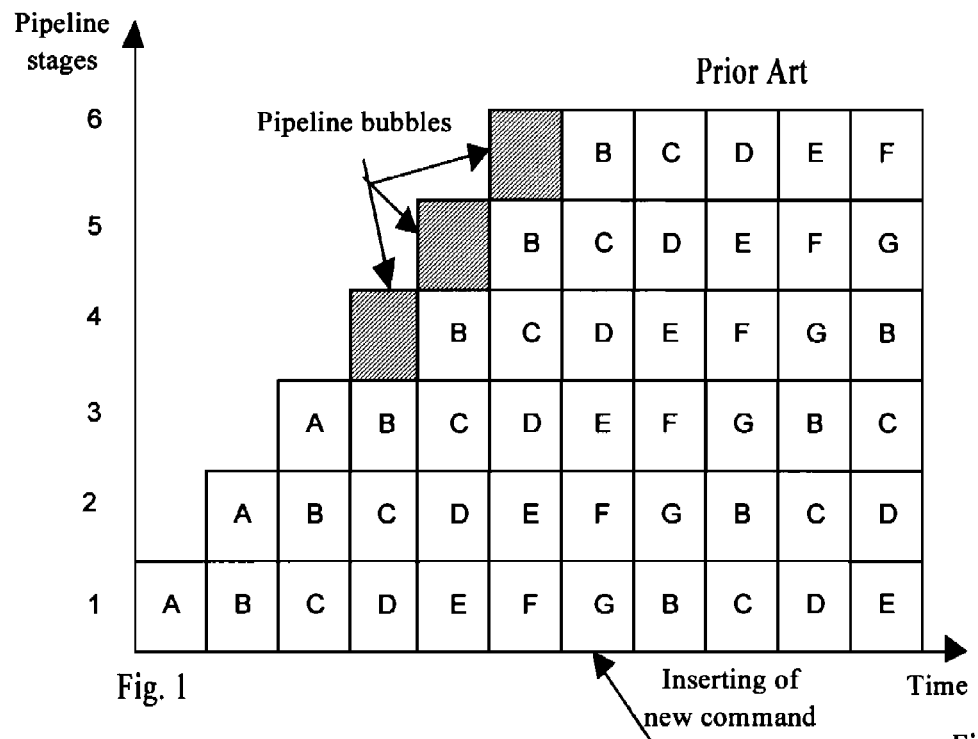
FIG. 1 illustrates the command submitting method of the pipeline in the prior art.

Referring to both FIG. 1 and FIG. 5, in the overlapping command submitting method according to the present invention, the Command G is inserted in the last cycle of the Command A before exiting the pipeline, avoiding the appearance of bubble, which can save up to six clock periods for inserting the following command into the pipeline compared with the conventional command submitting method of inserting processor, and the waiting interval for submitting commands is also reduced by 6 clock periods. Therefore, the new command inserting method in the present invention—the overlapping command submitting method can effectively improve the utilization efficiency of every element of the pipeline and further increase the speed of the command execution.

INDUSTRIAL APPLICABILITY

Although the above embodiment is an example of a particular kind of communications chip, it is obvious that the overlapping command submitting method of dynamic cycle pipeline is not limited to one or several kinds of command(s), and thus can be applied to other chips with the cycle pipeline structure wherein the entering stage and exiting stage of the pipeline commands are not the same stage.

What is claimed is:

1. An overlapping command submitting method of dynamic cycle pipeline, for a chip having a pipeline including a plurality of stages, comprising the following steps:
   (a) reading a new command from a command buffer and storing it in a command register;
   (b) decoding the new command;
   (c) preparing initial operators of each stage of the pipeline, and storing them into an initialization register of the pipeline;
   (d) judging whether the pipeline is not full, if it is not full, directly inserting the new command; otherwise, waiting for an exiting signal provided by the pipeline, the exiting signal being sent during a pipeline period immediately before a last cycle of an old command exiting the pipeline;
   (e) after receiving the exiting signal, judging whether there is command relevance between the new command to be inserted and the old command to exit, if yes, then inserting the new command after the old command exits; otherwise, performing a next step;
   (f) when the old command is in its last cycle, inserting the new command into the pipeline, wherein the new command is inserted into the pipeline at a pipeline stage that is the same as the old command during the last cycle of the old command;
   wherein the new command and the old command each contain a field,
   wherein step (e) includes determining whether there is any field conflict between the new command and the old command,
   wherein if there is any field conflict between the new command and the old command, then a field branch is created, the field branch including a major current register for storing the field of the new command and a branch current register for storing the field of the old command, the field of the new command being added into the pipeline when submitting, and the field of the old command being entered into the branch current register and maintained in the field branch until the old command uses the field for the last time, wherein the major current register and the branch current register are connected to a hardware processing module through a multi-route switch, wherein if the new command is processed by the hardware processing module, the hardware processing module receives an input of the major current register in which the field of the new command is stored, and if the old command is processed by the hardware processing module, the hardware processing module receives an input from the branch current register in which the field of the old command is stored, and wherein if there is no field conflict, a field switch is conducted in a corresponding pipeline segment after submitting.

2. The command submitting method of claim 1, wherein the Step (b) also includes a step of judging whether there is an illegal command, if there is, then deleting the illegal command and returning to Step (a); otherwise, conducting the next step.

3. The command submitting method of claim 2, wherein said illegal command includes: a command with an incorrect command code and/or carrying unreasonable command parameters.

4. A chip on which the method according to claim 3, is carried out having the dynamic cycle pipeline, comprising: an interface of host computer, input buffer, command processing unit, and result unit; the command processing unit comprises: command interpreter and pipeline performing unit; characterized in that the command interpreter further comprises: command buffer controller, command register, operator processing unit, pipeline initialization register and control automaton, which are connected in order; the control automaton controls the command buffer controller to read a command from the command buffer, and stores the command into the command register; the control automaton decodes the command, and controls the operator processing unit to prepare initial operators of each pipeline stage according to a type of the command, and stores them into the pipeline initialization register, wherein the command processing unit sends the new command to the same pipeline stage as the old command when the exiting signal of the old command is received, or there is no command relevancy between the new command and the old command, and the old command is in the last cycle of the pipeline.

5. The command submitting method of claim 2, wherein the exiting signal is released two stages before the new command enters the pipeline.

6. The command submitting method of claim 2, wherein the command relevance means that the new command and the old command cannot share the hardware processing module in the same pipeline stage.

7. A chip on which the method according to claim 2, is carried out having the dynamic cycle pipeline, comprising: an interface of host computer, input buffer, command processing unit, and result unit; the command processing unit comprises: command interpreter and pipeline performing unit; characterized in that the command interpreter further comprises: command buffer controller, command register, operator processing unit, pipeline initialization register and control automaton, which are connected in order; the control automaton controls the command buffer controller to read a command from the command buffer, and stores the command into the command register; the control automaton decodes the command, and controls the operator processing unit to prepare initial operators of each pipeline stage according to a type of the command, and stores them into the pipeline initialization register, wherein the command processing unit sends the new command to the same pipeline stage as the old command when the exiting signal of the old command is received, or there is no command relevancy between the new command and the old command, and the old command is in the last cycle of the pipeline.

8. The command submitting method of claim 1, wherein the exiting signal is released two stages before the new command enters the pipeline.

9. The command submitting method of claim 1, wherein the command relevance means that the new command and the old command cannot share the hardware processing module in the same pipeline stage.

10. The command submitting method of claim 1, wherein in the Step (e), it is also judged in which stage of the pipeline, a field switch shall be conducted for the new command and the old command, and the field switch is completed in a corresponding pipeline stage where the new command and the old command overlaps.

11. A chip on which the method according to claim 10, is carried out having the dynamic cycle pipeline, comprising: an interface of host computer, input buffer, command processing unit, and result unit; the command processing unit comprises: command interpreter and pipeline performing unit; characterized in that the command interpreter further comprises: command buffer controller, command register, operator processing unit, pipeline initialization register and control automaton, which are connected in order; the control automaton controls the command buffer controller to read a command from the command buffer, and stores the command into the command register; the control automaton decodes the command, and controls the operator processing unit to prepare initial operators of each pipeline stage according to a type of the command, and stores them into the pipeline initialization register, wherein the command processing unit sends the new command to the same pipeline stage as the old command when the exiting signal of the old command is received, or there is no command relevancy between the new command and the old command, and the old command is in the last cycle of the pipeline.

12. The command submitting method of claim 1, wherein in the Step (c), it is required to provide an initial status of each command when each command enters the pipeline.

13. A chip on which the method according to claim 12, is carried out having the dynamic cycle pipeline, comprising: an interface of host computer, input buffer, command processing unit, and result unit; the command processing unit comprises: command interpreter and pipeline performing unit; characterized in that the command interpreter further comprises: command buffer controller, command register, operator processing unit, pipeline initialization register and control automaton, which are connected in order; the control automaton controls the command buffer controller to read a command from the command buffer, and stores the command into the command register; the control automaton decodes the command, and controls the operator processing unit to prepare initial operators of each pipeline stage according to a type of the command, and stores them into the pipeline initialization register, wherein the command processing unit sends the new command to the same pipeline stage as the old command when the exiting signal of the old command is received, or there is no command relevancy between the new command and the old command, and the old command is in the last cycle of the pipeline.

14. The command submitting method of claim 1, wherein each command includes reading/writing memory commands, reading/writing control register commands and various searching commands.

15. A chip on which the method according to claim 14, is carried out having the dynamic cycle pipeline, comprising: an interface of host computer, input buffer, command processing unit, and result unit; the command processing unit comprises: command interpreter and pipeline performing unit; characterized in that the command interpreter further comprises: command buffer controller, command register, operator processing unit, pipeline initialization register and control automaton, which are connected in order; the control automaton controls the command buffer controller to read a command from the command buffer, and stores the command into the command register; the control automaton decodes the command, and controls the operator processing unit to prepare initial operators of each pipeline stage according to a type of the command, and stores them into the pipeline initialization register, wherein the command processing unit sends the new command to the same pipeline stage as the old command when the exiting signal of the old command is received, or there is no command relevancy between the new command and the old command, and the old command is in the last cycle of the pipeline.

16. A chip on which the method according to claim 1, is carried out having the dynamic cycle pipeline, comprising: an interface of host computer, input buffer, command processing unit, and result unit; the command processing unit comprises: command interpreter and pipeline performing unit; characterized in that the command interpreter further comprises: command buffer controller, command register, operator processing unit, pipeline initialization register and control automaton, which are connected in order; the control automaton controls the command buffer controller to read a command from the command buffer, and stores the command into the command register; the control automaton decodes the command, and controls the operator processing unit to prepare initial operators of each pipeline stage according to a type of the command, and stores them into the pipeline initialization register, wherein the command processing unit sends the new command to the same pipeline stage as the old command when the exiting signal of the old command is received, or there is no command relevancy between the new command and the old command, and the old command is in the last cycle of the pipeline.

17. A chip on which the method according to claim 1, is carried out having the dynamic cycle pipeline, comprising: an interface of host computer, input buffer, command processing unit, and result unit; the command processing unit comprises: command interpreter and pipeline performing unit; characterized in that the command interpreter further comprises: command buffer controller, command register, operator processing unit, pipeline initialization register and control automaton, which are connected in order; the control automaton controls the command buffer controller to read a command from the command buffer, and stores the command into the command register; the control automaton decodes the command, and controls the operator processing unit to prepare initial operators of each pipeline stage according to a type of the command, and stores them into the pipeline initialization register, wherein the command processing unit sends the new command to the same pipeline stage as the old command when the exiting signal of the old command is received, or there is no command relevancy between the new command and the old command, and the old command is in the last cycle of the pipeline.

\* \* \* \* \*